Dec. 12, 1950         G. G. MARX         2,534,044
CABLE WEIGHT FOR HOISTS
Filed April 18, 1946
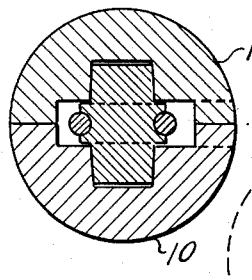
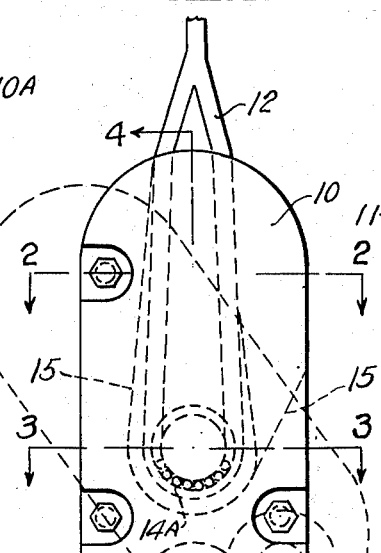
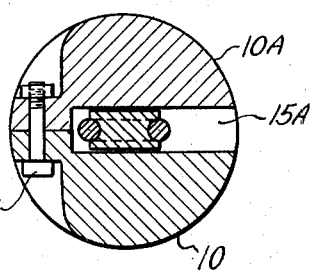
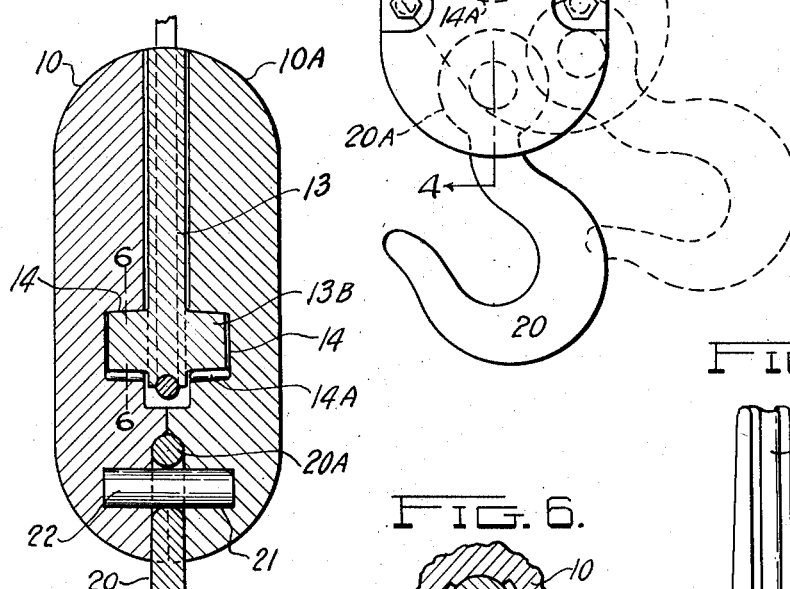
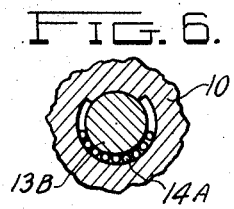
INVENTOR.
George G. Marx
BY Hawke & Hardesty
ATTORNEYS Patented Dec. 12, 1950

2,534,044

UNITED STATES PATENT OFFICE 2,534,044

CABLE WEIGHT FOR HOISTS

George G. Marx, Detroit, Mich.

Application April 18, 1946, Serial No. 663,219

2 Claims. (Cl. 294—82)

The present invention relates to cable tensioning weights for hoisting machinery and specifically a weight of this sort that has a number of specific advantages over the conventional weights used for the same purpose.

Among the objects of the invention is a weight of the kind indicated in which the load hook is readily replaceable.

Another object is a weight which will automatically release the load from the hook when the load comes to rest on its intended support.

Still other objects and advantages will be apparent to those skilled in the art upon reference to the following description and the accompanying drawings in which Fig. 1 is a view in elevation of a weight involving the invention and showing in dotted lines its unloading position.

Fig. 2 is a section on line 2—2 of Fig. 1.

Fig. 3 is a section on line 3—3 of Fig. 1.

Fig. 4 is a section on line 4—4 of Fig. 1.

Fig. 5 is a perspective view of a detail.

Fig. 6 is a section on line 6—6 of Fig. 4.

In the drawings the weight is shown as consisting of two half members 10 and 10A fixed together by bolts 11 to produce an elongated circular cross section mass. This mass of cast metal is suspended by a cable 12 which is provided with an eye adapted to surround and rest in the groove 13A of the element 13 shown by itself in Fig. 5.

This element 13 consists of a grooved elongated member somewhat larger at its lower portion and adapted to fit within the eye of the cable, being rounded at the bottom so as not to produce a sharp bend in the cable. This element at its lower and larger end is provided with large integral coaxial trunnions 13B adapted to fit in suitable bearing recesses or sockets 14 in the two halves of the weight, which sockets are preferably somewhat to the right of the vertical center line of weight when in the position shown in Fig. 1.

Each of the halves 10 and 10A is cut away as indicated by the line 15 to provide a slot 15A open to one side of the weight to allow the weight to tip in one direction as indicated in Fig. 1. In order to facilitate the tipping of the weight, the underside of the sockets 14 may be provided with antifriction rollers 14A.

At the lower end of the weight a suitable load hook 20 is fixed by providing cutouts in the two halves of such size and shape as to accommodate the eye 20A and a portion of the shank of hook 20 and sockets or recesses 21 provided for the reception of the ends of a suitable pin 22 passing through the eye 20A.

The center line of trunnions 13B should be below the center of mass of the weight so that when the load carried by hook 20 is lowered to rest upon a suitable supporting surface, the upper portion of the weight will swing over to the dotted line position of Figure 1 and move the hook to a position in which it may easily be withdrawn from engagement with the load.

Now having described the invention and the preferred embodiment thereof, it is to be understood that such invention is to be limited, not to the specific details herein set forth, but only by the scope of the claims which follow.

I claim:

1. A cable tensioning weight for hoists consisting of an ovoid body of metal divided on a central longitudinal plane, means for fixing the parts together, a load hook rigidly secured at one end of said body, a supporting cable extending into said body and applied thereto at a point between the hook and the center of mass of said body and hook, and means permitting the tilting of said body on said cable in one direction in the plane of the hook and in such direction as to open the hook downwardly.

2. A cable tensioning weight for hoists consisting of an ovoid body of metal divided on a central longitudinal plane, means for fixing the parts together, a load hook rigidly secured at one end of said body, a cable provided with an eye, a member fitting in said eye and having at its lower end a pair of axially aligned trunnions, and bearings for said trunnions in the two parts of said body, the axis of said trunnion bearings being at right angles to the plane of said hook and at a point between the hook and the center of mass of said body and hook, said body parts being cut away to permit swinging of said body about said trunnions in one direction from the vertical.

GEORGE G. MARX.

REFERENCES CITED

The following references are of record in the file of this patent:

FOREIGN PATENTS

| Number | Country | Date |
|---|---|---|
| 1,322 | Great Britain | June 3, 1856 |